US012578970B2

(12) United States Patent
Xiong

(10) Patent No.: US 12,578,970 B2
(45) Date of Patent: Mar. 17, 2026

(54) EXPOSING PORTIONS OF BIOS SETTINGS TO AN OPERATING SYSTEM IN A PRE-BOOT ENVIRONMENT

(71) Applicant: Dell Products L.P., Round Rock, TX (US)

(72) Inventor: Li Xiong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 318 days.

(21) Appl. No.: 17/882,316

(22) Filed: Aug. 5, 2022

(65) Prior Publication Data

US 2024/0028345 A1 Jan. 25, 2024

(30) Foreign Application Priority Data

Jul. 20, 2022 (CN) .......................... 202210859791.8

(51) Int. Cl.
*G06F 9/4401* (2018.01)
(52) U.S. Cl.
CPC .......... *G06F 9/4406* (2013.01); *G06F 9/4401* (2013.01)
(58) Field of Classification Search
CPC .............................. G06F 9/4406; G06F 9/4401
See application file for complete search history.

(56) References Cited

U.S. PATENT DOCUMENTS

| | | | | |
|---|---|---|---|---|
| 8,904,162 | B2 * | 12/2014 | Futral ................... | G06F 21/575 |
| | | | | 713/1 |
| 8,914,887 | B2 * | 12/2014 | Dalcher ............... | G06F 9/4403 |
| | | | | 726/25 |
| 9,081,734 | B2 * | 7/2015 | Soderlund ............. | G06F 9/4406 |
| 10,942,750 | B2 * | 3/2021 | Atta ...................... | G06F 9/4401 |
| 11,126,420 | B2 * | 9/2021 | Ganesan ............. | G06F 13/4221 |
| 11,288,077 | B2 * | 3/2022 | Hirst ..................... | G06F 9/4401 |
| 11,334,436 | B2 * | 5/2022 | Suryanarayana ... | G06F 11/3688 |
| 11,520,596 | B2 * | 12/2022 | Thom ..................... | G06F 21/78 |
| 11,783,043 | B2 * | 10/2023 | Perez .................... | G06F 21/575 |
| | | | | 713/2 |
| 12,013,946 | B2 * | 6/2024 | Liu ........................ | G06F 9/4411 |
| 2011/0271268 | A1 * | 11/2011 | Dang .................... | G06F 9/4486 |
| | | | | 717/168 |
| 2016/0364243 | A1 * | 12/2016 | Puthillathe ............ | G06F 9/4411 |

* cited by examiner

*Primary Examiner* — Tammara R Peyton
(74) *Attorney, Agent, or Firm* — Jackson Walker L.L.P.

(57) ABSTRACT

An information handling system may include at least one processor and a non-transitory, computer-readable medium having instructions thereon that are executable by the at least one processor for: during a pre-boot environment of the information handling system: allocating a portion of memory of the information handling system; and copying data from at least one variable of the pre-boot environment into the allocated portion of memory; and during runtime of an operating system of the information handling system: accessing the allocated portion of memory to read the at least one variable.

18 Claims, 3 Drawing Sheets

200

202 — UEFI BOOT LOADER STARTS

204 — AGENT ALLOCATES PHYSICAL MEMORY

206 — AGENT COPIES VARIABLE DATA TO MEMORY

208 — AGENT PASSES MEMORY ADDRESS TO KERNEL

210 — AGENT EXITS

212 — UEFI BOOT LOADER LOADS OS KERNEL AND EXITS

214 — OS KERNEL STARTS

PHYSICAL ADDRESS

216 — OS VALIDATE THE MEMORY STARTING FROM THE PHYSICAL ADDRESS

218 — OS PRESENTS THE DATA TO APPLICATION

200

202 — UEFI BOOT LOADER STARTS

204 — AGENT ALLOCATES PHYSICAL MEMORY

206 — AGENT COPIES VARIABLE DATA TO MEMORY

208 — AGENT PASSES MEMORY ADDRESS TO KERNEL

210 — AGENT EXITS

212 — UEFI BOOT LOADER LOADS OS KERNEL AND EXITS

214 — OS KERNEL STARTS

PHYSICAL ADDRESS

216 — OS VALIDATE THE MEMORY STARTING FROM THE PHYSICAL ADDRESS

218 — OS PRESENTS THE DATA TO APPLICATION

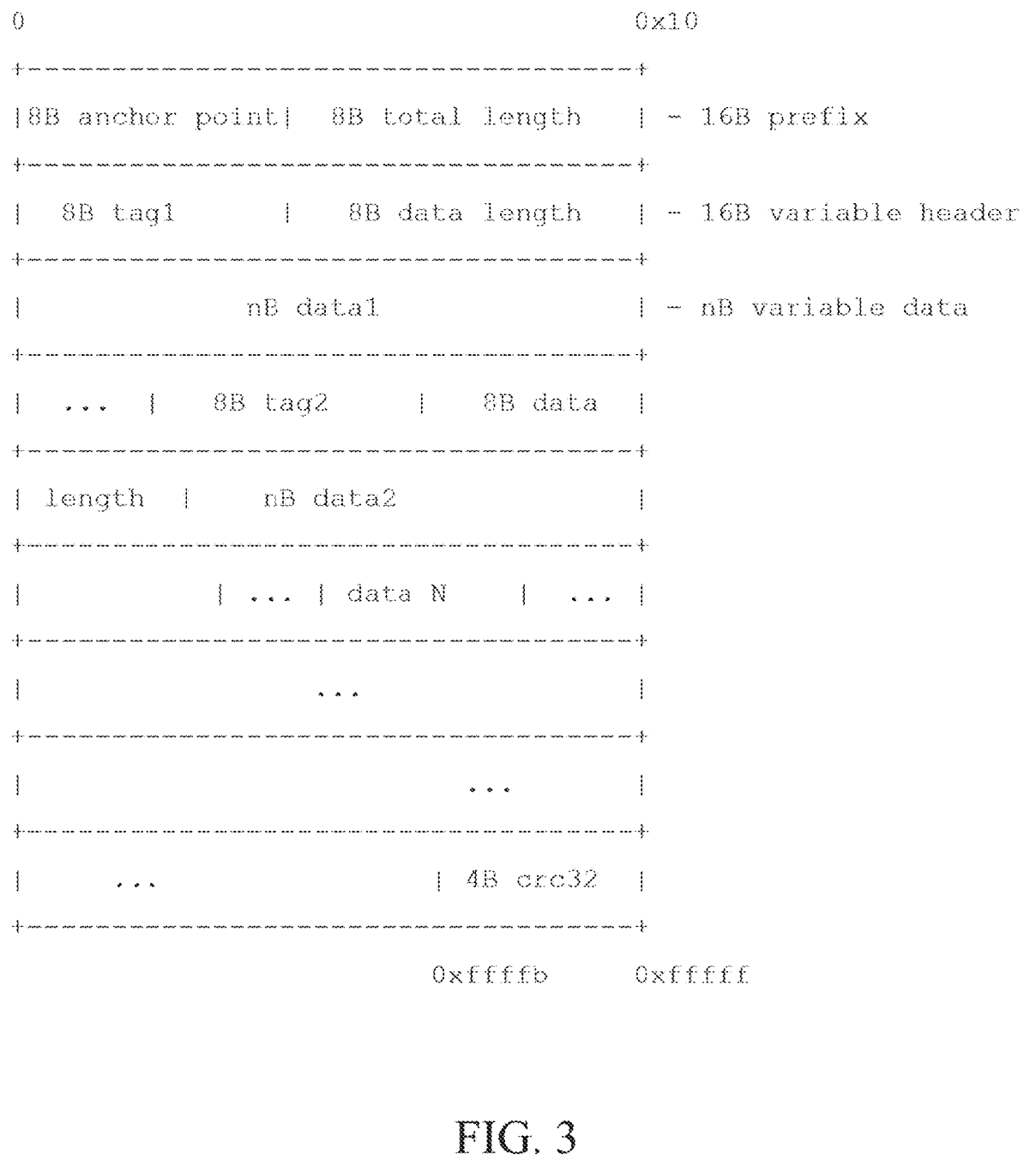

```
0                                           0x10
+-----------------------------------------+
|8B anchor point|  8B total length        | - 16B prefix
+-----------------------------------------+
|  8B tag1      |    8B data length        | - 16B variable header
+-----------------------------------------+
|               nB data1                  | - nB variable data
+-----------------------------------------+
|  ...  |    8B tag2     |   8B data       |
+-----------------------------------------+
| length  |    nB data2                    |
+-----------------------------------------+
|             |  ... |  data N    |  ...   |
+-----------------------------------------+
|                      ...                  |
+-----------------------------------------+
|                        ...               |
+-----------------------------------------+
|       ...                  |  4B crc32   |
+-----------------------------------------+
                  Oxffffb     Oxfffff
```

FIG. 3

EXPOSING PORTIONS OF BIOS SETTINGS TO AN OPERATING SYSTEM IN A PRE-BOOT ENVIRONMENT

TECHNICAL FIELD

The present disclosure relates in general to information handling systems, and more particularly to accessing Basic Input/Output System (BIOS) information from an operating system (OS) of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various items of data may be stored by a BIOS (e.g., a Unified Extensible Firmware Interface (UEFI) BIOS) of an information handling system. For example, settings may be stored in the form of UEFI variables in non-volatile random-access memory (NVRAM).

In some situations, it may be advantageous for platform software to be able to monitor BIOS settings from within an executing OS of the system. Such monitoring may be leveraged to protect firmware security by detecting unwanted changes, as well as to provide various other features. Challenges exist, however, in accessing such data from within an OS of the information handling system.

Various terms discussed herein are described in the UEFI Specification version 2.8, which was released in March 2019 (hereinafter, UEFI Specification), which is hereby incorporated by reference in its entirety. One of ordinary skill in the art with the benefit of this disclosure will understand its applicability to other specifications (e.g., prior or successor versions of the UEFI Specification) Further, some embodiments may be applicable to different technologies other than UEFI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with accessing BIOS data from an OS may be reduced or eliminated.

In accordance with embodiments of the present disclosure, an information handling system may include at least one processor and a non-transitory, computer-readable medium having instructions thereon that are executable by the at least one processor for: during a pre-boot environment of the information handling system: allocating a portion of memory of the information handling system; and copying data from at least one variable of the pre-boot environment into the allocated portion of memory; and during runtime of an operating system of the information handling system: accessing the allocated portion of memory to read the at least one variable.

In accordance with these and other embodiments of the present disclosure, a method may include during a pre-boot environment of an information handling system: allocating a portion of memory of the information handling system; and copying data from at least one variable of the pre-boot environment into the allocated portion of memory; and during runtime of an operating system of the information handling system: accessing the allocated portion of memory to read the at least one variable.

In accordance with these and other embodiments of the present disclosure, an article of manufacture may include a non-transitory, computer-readable medium having computer-executable code thereon that is executable by a processor of an information handling system for: during a pre-boot environment of the information handling system: allocating a portion of memory of the information handling system; and copying data from at least one variable of the pre-boot environment into the allocated portion of memory; and during runtime of an operating system of the information handling system: accessing the allocated portion of memory to read the at least one variable.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an example data structure, in accordance with embodiments of the present disclosure.

DETAILED DESCRIPTION

Figure 1:
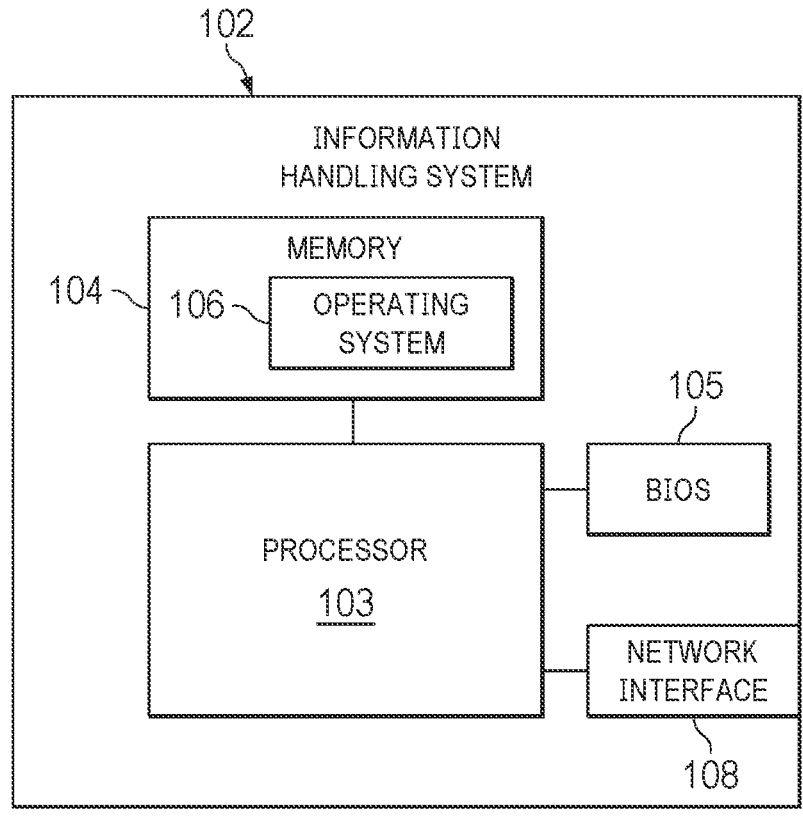
FIG. 1 illustrates a block diagram of an example information handling system, in accordance with embodiments of the present disclosure.
Figure 2:
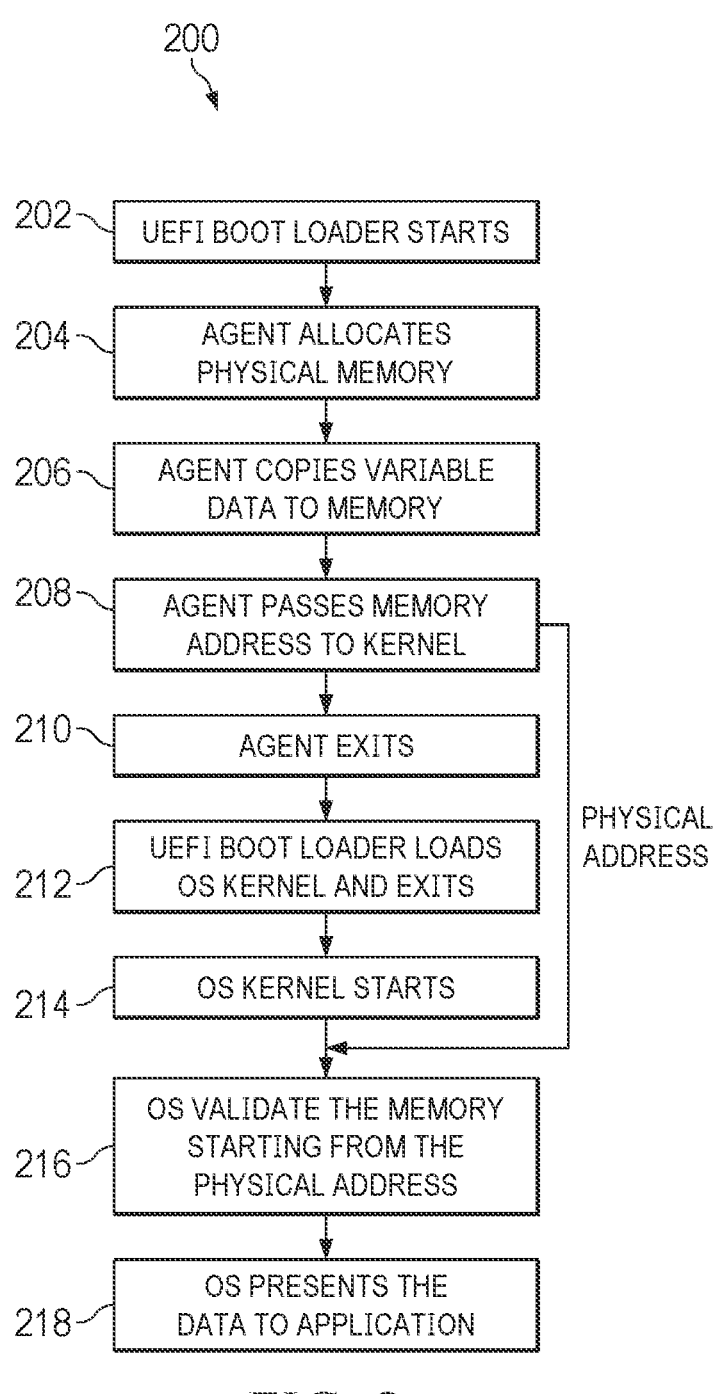
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS)

communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, there are currently difficulties in accessing BIOS data (e.g., settings, variables, etc.) from within an OS. In one implementation, a running OS or kernel module thereof may access an application programming interface (API) such as a UEFI API to retrieve such BIOS data. However, this technique may include certain drawbacks.

For example, some sensitive BIOS variables are defined as "Boot Services" variables, as opposed to "Runtime Services" variables. The accessible lifetime of such variables lasts only until the end of BIOS initialization, terminating when a call is made to ExitBootServices( ). (See UEFI Specification, Chapter 7.) In order to let the OS access these variables via a UEFI API, the BIOS may thus need to be modified to promote these variables to variables having the Runtime Services type. Such modifications are generally BIOS-specific and may not be ideal for many situations. Further, because the standard UEFI API supports read/write access for Runtime Services variables, users (e.g., any user with root privileges) may also be able to change the values of these sensitive BIOS settings from within the OS. This runs counter to the objective of keeping the BIOS settings secure.

Accordingly, some embodiments of this disclosure may overcome such drawbacks, providing a solution that is usable across many different BIOS implementations. One embodiment is implemented via an OS bootloader agent and an OS kernel module or service, allowing user applications to read BIOS data in a controlled manner from within the running OS.

In one implementation, the agent may run during boot-loader execution in order to capture variable data (e.g., including both Boot Services and Runtime Services variables) in a way that makes it available later to an OS kernel. During OS runtime, the kernel module may receive and validate such data, and then make it available to user space applications. Turning now to FIG. 2, an example method 200 is shown for exposing BIOS settings to an OS, according to some embodiments.

According to this embodiment, before the OS kernel is loaded, a pre-boot environment such as a UEFI bootloader may start execution at step 202, and the UEFI bootloader may execute code referred to herein as an agent. At step 204, the agent may allocate a desired amount of memory (e.g., allocate a contiguous portion of the available physical memory space, having a specified size that is large enough to contain the necessary BIOS variable data). The UEFI function AllocatePages( ) may be used for this purpose in one implementation. Further, a proper allocation type such as "EfiLoaderData" may be specified so that the OS kernel will not use this part of memory during its own memory initialization. (See UEFI Specification, Table 30.) Upon successful allocation, a valid physical memory address (e.g., a page-aligned address in some implementations) pointing to the beginning of the allocated memory may be returned.

At step 206, the agent may then enumerate all of the UEFI variables (or a subset thereof, which may be specified by a user), read the value of each variable, and copy this information into a data structure residing in the allocated memory space. The data structure may contain the necessary information to identify the total allocated data length, corresponding pairs of variable names and variable values, checksum(s), and/or any other suitable information. FIG. 3 illustrates an example data structure in which 1 MB of memory is reserved, and N variables are stored with 8-byte identification tags, 8-byte length designations, and n-byte data sections (which need not be the same size for each variable), along with a CRC32 checksum encoded at the end. Any unused portion of the allocation may be initialized to zero, and as shown, the CRC32 may be calculated from offset 0 to offset 0xffffb (e.g., over the entire allocation, excluding the checksum itself). One of ordinary skill in the art with the benefit of this disclosure will appreciate that other data formats are also possible in other implementations.

The data written into this allocated space is a copy of the BIOS variables and resides in a separate physical memory space, and so there is no mapping back to the original variable data source. Accordingly, any writes to the allocated memory may have no impact on the actual BIOS variable values.

At step 208, the agent may then pass the physical memory address for this allocation to the OS kernel (e.g., as an input parameter or an environment variable). Accordingly, the kernel module may later be able to determine the location of the saved BIOS data.

Once the agent has allocated and written the memory data structure, the agent may exit at step 210. At step 212, the OS boot loader may continue its normal operation to load the OS kernel and call ExitBootServices( ). As discussed above, the UEFI Boot Services variables may then become inaccessible, but the copy of those variables (as well as the copy of the Runtime Services variables) in the allocated physical memory remains accessible.

Once the OS kernel is loaded at step 214, a kernel module or service may execute a "sanity check" at step 216 to ensure that the data structure is valid, the checksum(s) are correct, etc. Once the data structure is validated, the kernel module may allow access to it at step 218, for example by creating a character device to handle data reads from user space programs. In other embodiments, the kernel module may be omitted, and a user space function such as pmap_map( ) (or similar functionality that may be implemented in other OSes) may be used instead to map the physical memory range into kernel virtual address space.

The BIOS data may then be readable from user space programs as discussed above.

One of ordinary skill in the art with the benefit of this disclosure will understand that the preferred initialization point for the method depicted in FIG. 2 and the order of the steps comprising the method may depend on the implementation chosen. In these and other embodiments, the method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a non-transitory, computer-readable medium having instructions thereon that are executable by the at least one processor for:
during a pre-boot environment of the information handling system:
allocating a portion of memory of the information handling system; and
copying data from at least one variable of the pre-boot environment into the allocated portion of memory; and
during runtime of an operating system of the information handling system:
accessing the allocated portion of memory to read the at least one variable.

2. The information handling system of claim 1, wherein allocating the portion of memory comprises performing a physical memory allocation.

3. The information handling system of claim 1, wherein copying the data from the at least one variable comprises copying the data into a data structure that comprises, for each of the at least one variable:
an identifier;
a length designation; and
a value of the at least one variable.

4. The information handling system of claim 1, wherein the at least one variable comprises a Unified Extensible Firmware Interface (UEFI) Boot Services variable.

5. The information handling system of claim 1, wherein the at least one variable comprises a Unified Extensible Firmware Interface (UEFI) Runtime Services variable.

6. The information handling system of claim 1, further configured to, during runtime of the operating system, perform a validation check of the allocated portion of memory.

7. A method comprising:
during a pre-boot environment of an information handling system:
allocating a portion of memory of the information handling system; and
copying data from at least one variable of the pre-boot environment into the allocated portion of memory; and
during runtime of an operating system of the information handling system:
accessing the allocated portion of memory to read the at least one variable.

8. The method of claim 7, wherein allocating the portion of memory comprises performing a physical memory allocation.

9. The method of claim 7, wherein copying the data from the at least one variable comprises copying the data into a data structure that comprises, for each of the at least one variable:
an identifier;
a length designation; and
a value of the at least one variable.

10. The method of claim 7, wherein the at least one variable comprises a Unified Extensible Firmware Interface (UEFI) Boot Services variable.

11. The method of claim 7, wherein the at least one variable comprises a Unified Extensible Firmware Interface (UEFI) Runtime Services variable.

12. The method of claim 7, further comprising, during runtime of the operating system, performing a validation check of the allocated portion of memory.

13. An article of manufacture comprising a non-transitory, computer-readable medium having computer-executable code thereon that is executable by a processor of an information handling system for:
during a pre-boot environment of the information handling system:
allocating a portion of memory of the information handling system; and
copying data from at least one variable of the pre-boot environment into the allocated portion of memory; and
during runtime of an operating system of the information handling system:
accessing the allocated portion of memory to read the at least one variable.

14. The article of claim 13, wherein allocating the portion of memory comprises performing a physical memory allocation.

15. The article of claim 13, wherein copying the data from the at least one variable comprises copying the data into a data structure that comprises, for each of the at least one variable:
an identifier;
a length designation; and
a value of the at least one variable.

16. The article of claim 13, wherein the at least one variable comprises a Unified Extensible Firmware Interface (UEFI) Boot Services variable.

17. The article of claim 13, wherein the at least one variable comprises a Unified Extensible Firmware Interface (UEFI) Runtime Services variable.

18. The article of claim 13, wherein the computer-executable code is further executable for: during runtime of the operating system, performing a validation check of the allocated portion of memory.

* * * * *